Feb. 19, 1924.

E. J. WAGNER 1,483,958

COAL JIGGER

Filed June 7, 1923

Inventor
EARL J. WAGNER,
By
Attorney

Patented Feb. 19, 1924.

1,483,958

UNITED STATES PATENT OFFICE.

EARL J. WAGNER, OF TAMAQUA, PENNSYLVANIA.

COAL JIGGER.

Application filed June 7, 1923. Serial No. 643,966.

*To all whom it may concern:*

Be it known that I, EARL J. WAGNER, residing at Tamaqua, Pennsylvania, a citizen of the United States, have invented certain new and useful Improvements in Coal Jiggers, of which the following is a specification.

My invention relates to jiggers for separating coal and slate and relates to the kind in which a gyratory motion is imparted to the pan which is suspended in the water holding tank and in particular my invention aims to produce a simpler and therefore less expensively made construction for producing the motion of the pan which is characteristic of the jigger of J. F. Wagner Patent No. 1,288,311 issued December 17, 1918 and to enable adjustment of the extent of motion of the pan at the receiving end according to whether the material is quick or sluggish in its motion which cannot well or advantageously be done in the case of the jigger of said patent. My invention consists in whatever is described by or is included within the terms or scope of the appended claims.

Figure 1:
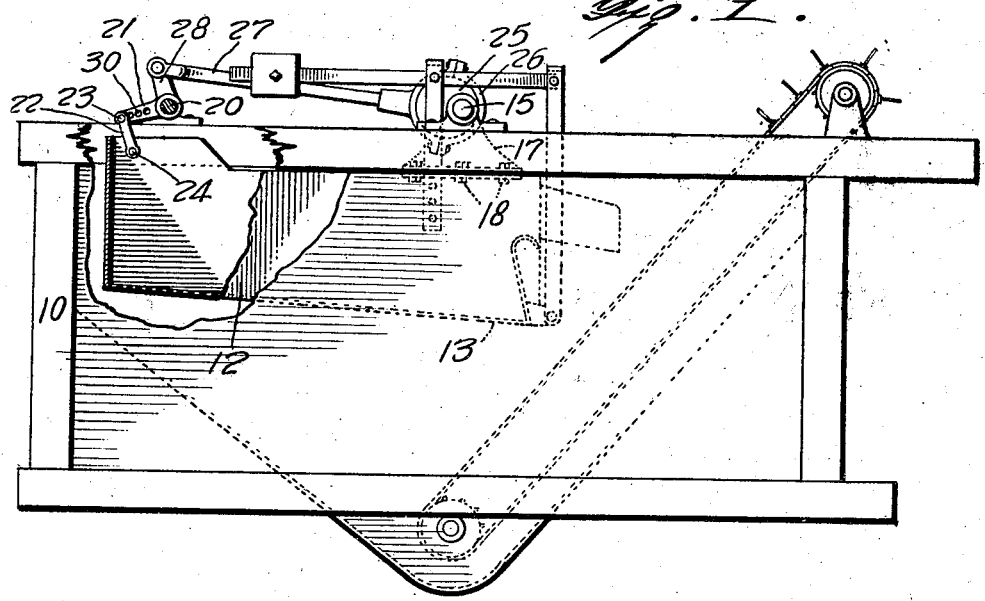
Fig. 1 is a side elevation with parts in section of a jigger embodying my invention.
Figure 2:
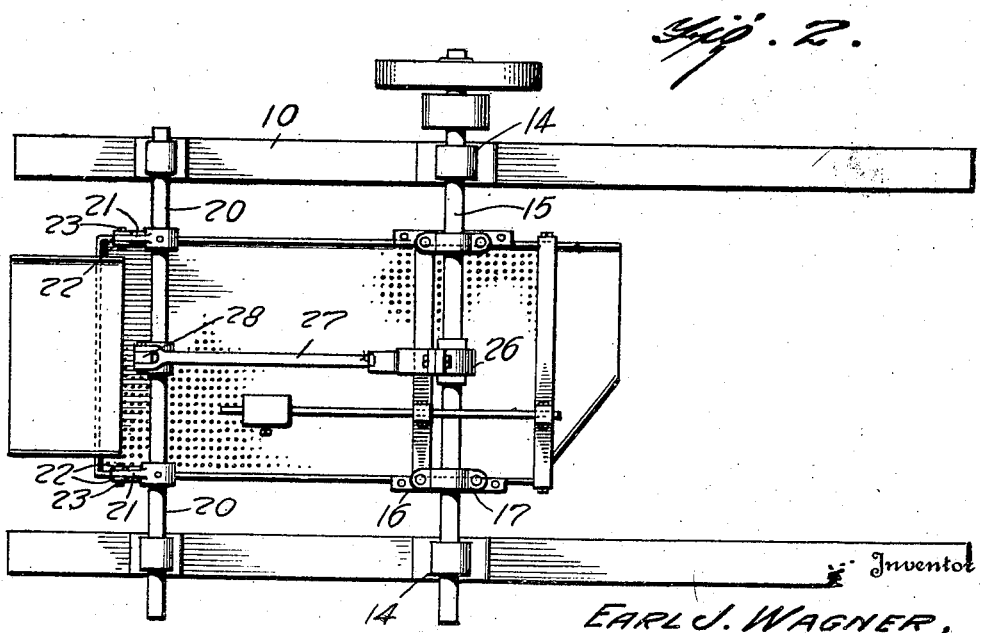
Fig. 2 is a top plan view thereof.

By the mechanism of the jigger of the patent above mentioned the gyratory movement of the pan is produced by two sets of eccentrics which respectively impart a circular motion to the connection with the pan and an up and down motion only to the other connection with the pan, this up and down motion being produced by a lever which rocks on a fixed pivot so that the eccentric means is formed to impart no movement except the rocking movement to such lever. Such a construction is more expensive to make than is desirable for commercial requirements and does not commercially lend itself to adjustability of the amount of motion of the pan which is desirable to suit the nature of the coal and slate being jigged so that it is necessary to suit each jigger gyrating mechanism to the requirements of the particular material being handled.

Describing in detail the embodiment of my invention shown in the drawing, the supporting framework, 10, the water tank, 11, and the pan, 12, with the automatic slate discharge, 13, are of usual construction and are similar to what is shown in the before mentioned Wagner patent excepting that the pan has an ordinary flat perforated bottom instead of the stepped construction shown in said patent. Journaled in bearings, 14, on the top of the framework and extending crosswise of the pan is a shaft, 15, having a band pulley for the transmission of power to rotate the shaft, to which shaft are keyed two eccentrics, 16, of ordinary construction, which are connected by suspending plates, 17, to the opposite sides of the pan by bolts, 18, at or near the discharge end of the pan, the pan being thus suspended from the two eccentrics and a circular motion being imparted to the discharge end of the pan by such eccentrics.

Journaled in bearings, 19, upon the framework, 10, above the receiving end of the pan, 12, is a rock shaft 20, which is connected with the opposite sides of the pan by crank arms, 21, pinned or keyed to the shaft and links, 22, that at their upper ends are pivoted by a pin or bolt, 23, to the respective crank arms, and at their lower ends by pivots, 24, are pivoted to the respective sides of the pan. A rocking motion is imparted to the shaft, 20, in unison, with the rotation of the shaft, 15, by an eccentric, 25, keyed to the shaft, 15, the strap, 26, of which is of ordinary construction and connected by a simple push and pull bar or link, 27, with a crank arm, 28, pinned or keyed to the rock shaft, 20. It will be seen that the rock shaft, 20, and the crank arms, 21 and 28, are in effect a bell crank lever, one arm (the crank 21) extending in a horizontal direction and the other arm (the crank 28) extending vertically or crosswise of the bar or link, 27, so that by reason of the jointed connection between the link, 27, and the crank, 28, there may be a horizontal to and fro movement of the link, 27, with the eccentric, 25, as well as an up and down movement and hence the eccentric and strap construction, 25 and 26 may be the customary construction and yet the gyratory motion which it is desired to impart to the pan throughout its extent and the maintenance of the pan in a horizontal or substantially horizontal position are secured.

But a single eccentric, 25, and its connections with the rock shaft, 20, is required and the same may be located either at one side of the pan and framework, 10, or as shown in the drawing it may be placed in the plane at the transverse center of the pan. To secure the proper action of the eccentrics upon the pan, the two sets of eccentrics are keyed to the shaft, 15, ninety degrees apart.

By making the connection between the eccentric pitman, 27, and the crank, 28, adjustable towards and from the shaft, 20, or the connection between the links, 22, and the crank arms, 21, adjustable towards and from the crank shaft, 20, the movement of the pan at the receiving end may be varied to suit the requirements of the slate and coal being acted upon according as the material is lively or sluggish in its action and adjustability in this respect is desirable only at the receiving end of the pan because the separation of slate and coal by the action of the water is there effected so that any change in motion of the pan at the discharge end where the slate and coal arrive after separation might result in mixing them up again. I show in the drawings each crank arm, 21, provided with several holes, 30, of graduated distance from the shaft, 20, so that the pivot 23, may be shifted to change the connection with each crank arm of the link, 24.

What I claim is:

1. The combination of a jig pan, a continuously rotating member, means connecting such member with the pan at one point of its length to impart continuous rotation to the pan at such point, a bell crank lever, means flexibly connecting the pan at another point in its length with such lever, such connection allowing a rotary motion of the pan at such point and means to rock said lever.

2. The combination of a jig pan, a continuously rotating member, means connecting such member with the pan at one point of its length to impart continuous rotation to the pan at such point, a bell crank lever, means flexibly connecting the pan at another point in its length with such lever, such connection allowing a rotary motion of the pan at such point and means to rock said lever, comprising a push and pull member that receives its motion in unison with said rotating member.

3. The combination of a jig pan, a continuously rotating shaft, eccentric means connected with the pan at one part of its length imparting rotary motion thereto, a bell crank lever a flexible connection between said lever and another point of the pan allowing rotary motion of the pan at such point and eccentric means connecting said shaft with said bell crank lever, and comprising a push and pull element.

4. The combination of a jig pan, means for suspending the pan at different points of its length and imparting rotary motion to the pan throughout its extent and comprising at one point a lever and a link connection between the lever and the pan, the connection between the lever and the link being adjustable to vary the extent of movement of the pan by the link.

In testimony whereof I hereunto affix my signature.

EARL J. WAGNER.